(12) United States Patent
Presz, Jr. et al.

(10) Patent No.: US 8,801,362 B2
(45) Date of Patent: Aug. 12, 2014

(54) FLUID TURBINE

(75) Inventors: Walter M. Presz, Jr., Wilbraham, MA (US); Michael J. Werle, West Hartford, CT (US); Thomas J. Kennedy, III, Wilbraham, MA (US); William Scott Keeley, Charleston, RI (US)

(73) Assignee: Ogin, Inc., Waltham, MA (US)

( * ) Notice: Subject to any disclaimer, the term of this patent is extended or adjusted under 35 U.S.C. 154(b) by 686 days.

(21) Appl. No.: 13/078,366

(22) Filed: Apr. 1, 2011

(65) Prior Publication Data

US 2011/0250062 A1  Oct. 13, 2011

Related U.S. Application Data

(63) Continuation-in-part of application No. 12/054,050, filed on Mar. 24, 2008, now Pat. No. 8,021,100, and a continuation-in-part of application No. 12/823,220, filed on Jun. 25, 2010, which is a continuation-in-part of application No. 12/555,446, filed on Sep. 8, 2009, now Pat. No. 8,393,850.

(60) Provisional application No. 61/415,550, filed on Nov. 19, 2010, provisional application No. 60/919,588, filed on Mar. 23, 2007, provisional application No. 61/191,358, filed on Sep. 8, 2008.

(51) Int. Cl.
*F03D 1/04* (2006.01)

(52) U.S. Cl.
USPC ............................................. 415/2.1

(58) Field of Classification Search
USPC .............................. 415/2.1, 4.1, 4.3, 4.5, 227
See application file for complete search history.

(56) References Cited

U.S. PATENT DOCUMENTS

| | | | |
|---|---|---|---|
| 4,025,220 A | 5/1977 | Thompson et al. | |
| 4,087,196 A * | 5/1978 | Kronmiller | 415/4.5 |
| 4,166,596 A | 9/1979 | Mouton, Jr. et al. | |
| 4,207,026 A | 6/1980 | Kushto | |
| 4,302,934 A | 12/1981 | Wynosky et al. | |
| 4,335,801 A | 6/1982 | Stachowiak et al. | |
| 4,786,016 A | 11/1988 | Presz, Jr. et al. | |
| 5,440,875 A | 8/1995 | Torkelson et al. | |
| 5,599,172 A * | 2/1997 | McCabe | 417/334 |

(Continued)

FOREIGN PATENT DOCUMENTS

CN  201425003 Y *  3/2010
DE  10145786 A1 *  4/2003

(Continued)

OTHER PUBLICATIONS

English Machine Translation. DE 10145786 A1. 15 pages.*

(Continued)

*Primary Examiner* — Richard Edgar
(74) *Attorney, Agent, or Firm* — McCarter & English, LLP

(57) ABSTRACT

A fluid turbine comprises a turbine shroud and an optional ejector shroud. The turbine shroud and/or the ejector shroud are formed from a hard shell and a membrane. The hard shell forms a leading edge, a trailing edge, and an interior surface of the shroud. The membrane forms an exterior surface of the shroud. The resulting construction is lighter than previous turbine shrouds.

15 Claims, 9 Drawing Sheets

(56) References Cited

U.S. PATENT DOCUMENTS

| | | | |
|---|---|---|---|
| 5,669,758 | A | 9/1997 | Williamson |
| 5,884,472 | A | 3/1999 | Presz, Jr. et al. |
| 7,976,270 | B2 | 7/2011 | Presz, Jr. et al. |
| 8,021,100 | B2 | 9/2011 | Presz, Jr. et al. |
| 8,393,850 | B2 | 3/2013 | Werle et al. |
| 2005/0069415 | A1 | 3/2005 | Ferracani |
| 2010/0090473 | A1 | 4/2010 | Glass |
| 2010/0247289 | A1 | 9/2010 | Presz, Jr. et al. |
| 2010/0284802 | A1 | 11/2010 | Presz, Jr. et al. |
| 2010/0308595 | A1 * | 12/2010 | Chen .............................. 290/55 |
| 2011/0002781 | A1 | 1/2011 | Presz, Jr. et al. |
| 2011/0014038 | A1 | 1/2011 | Werle et al. |
| 2011/0091311 | A1 * | 4/2011 | Uehara ......................... 415/4.1 |

FOREIGN PATENT DOCUMENTS

| | | | |
|---|---|---|---|
| EP | 0045202 | A1 | 2/1982 |
| EP | 45202 | A1 * | 2/1982 |
| WO | 2008118405 | A2 | 10/2008 |
| WO | 2010028342 | A2 | 3/2010 |
| WO | 2010141715 | A2 | 12/2010 |
| WO | 2010141867 | A2 | 12/2010 |
| WO | 2011031365 | A2 | 3/2011 |

OTHER PUBLICATIONS

International Preliminary Report on Patentability for International Application No. PCT/US2011/061517 dated May 21, 2013 (7 pages).

Hansen et al., "Effect of Placing a Diffuser Around a Wind Turbine," Wind Energy, 2000, pp. 3:207-213. (No publication month available; however, per MPEP 609.04(a), Applicant submits that the year of publication is sufficiently earlier than the effective U.S. filing date and any foreign priority date so that the particular month of publication is not in issue.).

Igra, O., "Research and Development for Shrouded Wind Turbines," Energy Cons. & Management, 1981, pp. 13-48, vol. 21. (No publication month available; however, per MPEP 609.04(a), Applicant submits that the year of publication is sufficiently earlier than the effective U.S. filing date and any foreign priority date so that the particular month of publication is not in issue.).

Igra, O., "Shrouds for Aerogenerators," AIAA Journal, Oct. 1976, pp. 1481-1483. vol. 14, No. 10.

International Search Report for International Application No. PCT/US2011/061517, dated May 24, 2012 (4 pages).

Werle, M.J. & Presz Jr., W. M., "Ducted Wind/Water Turbines and Propellers Revisited," Journal of Propulsion and Power, vol. 24, No. 5 (Sep. 2008), 1146-1150.

* cited by examiner

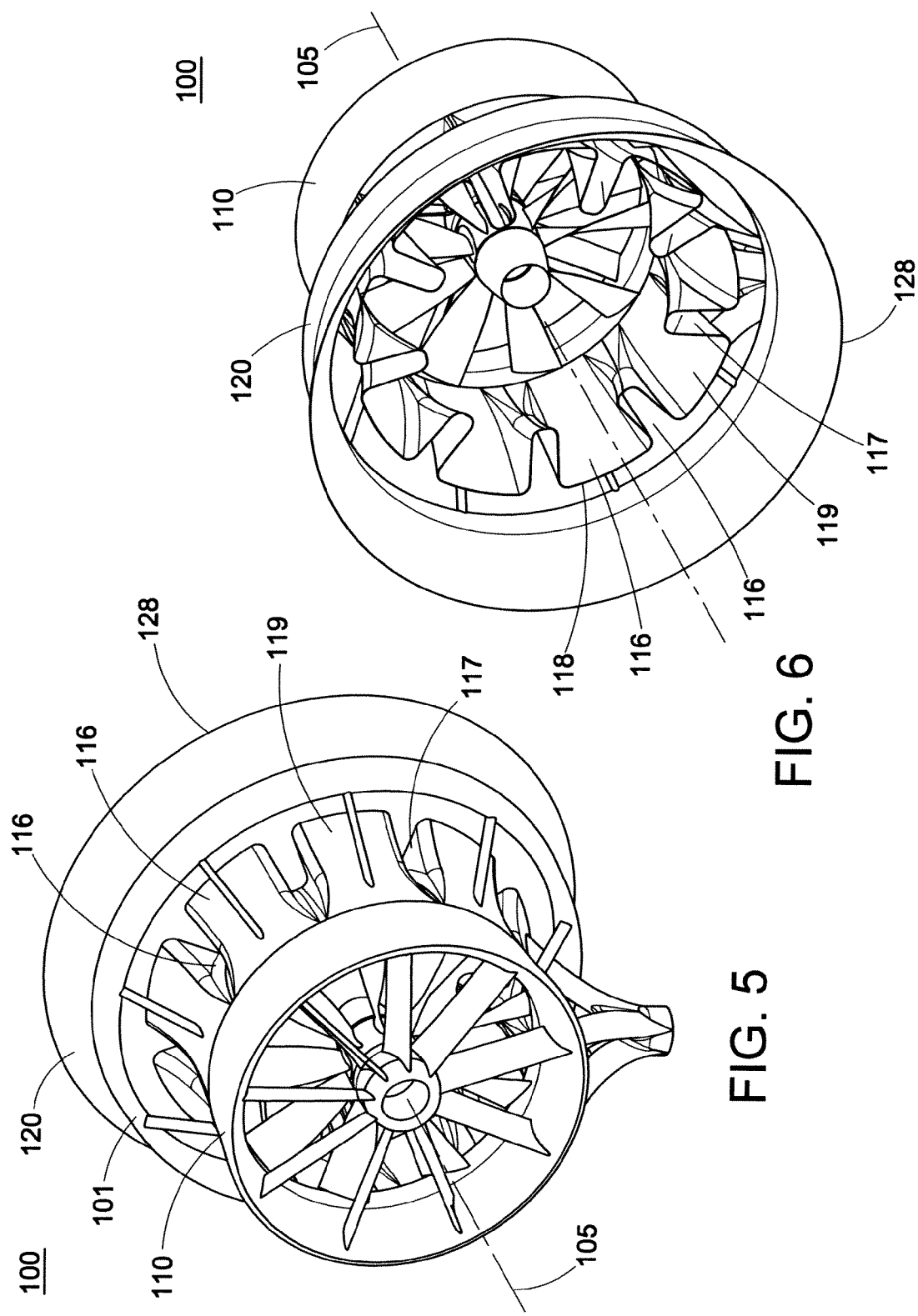

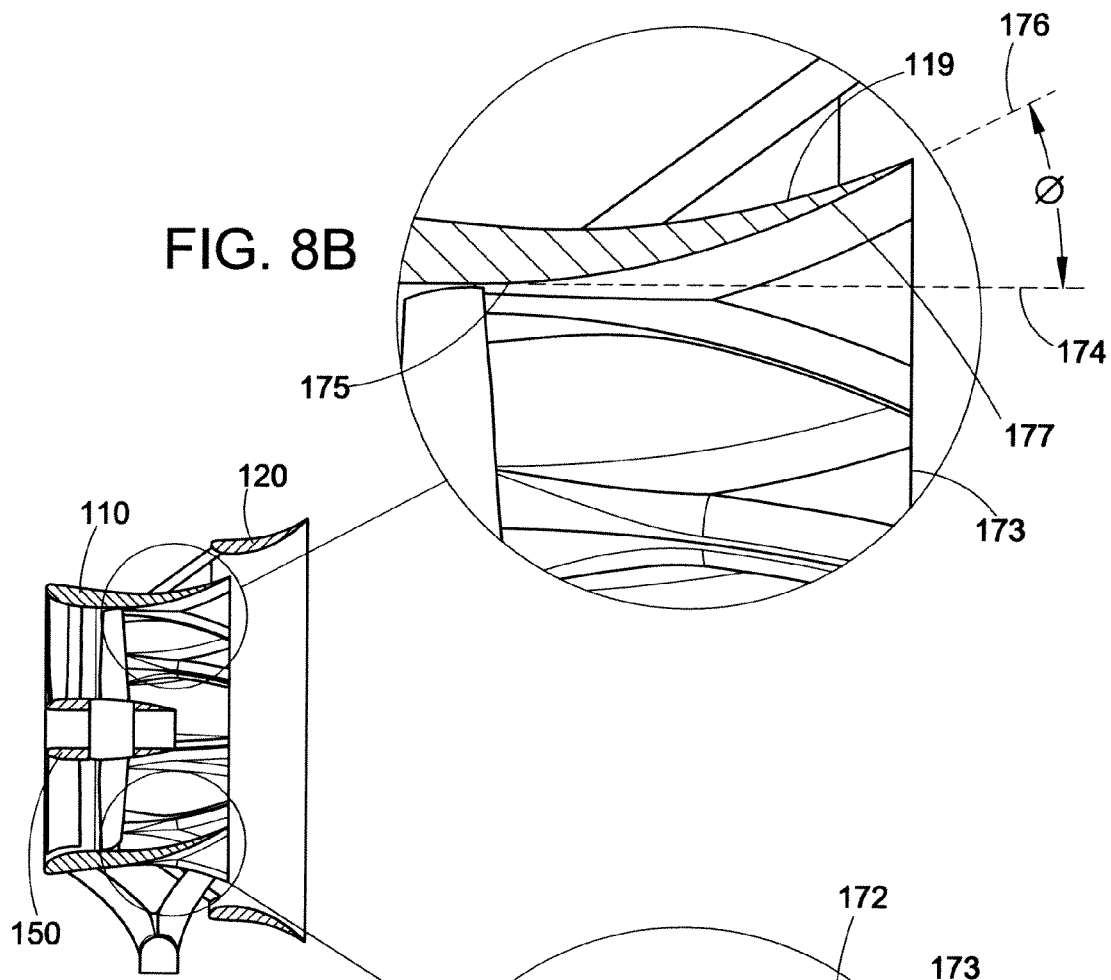
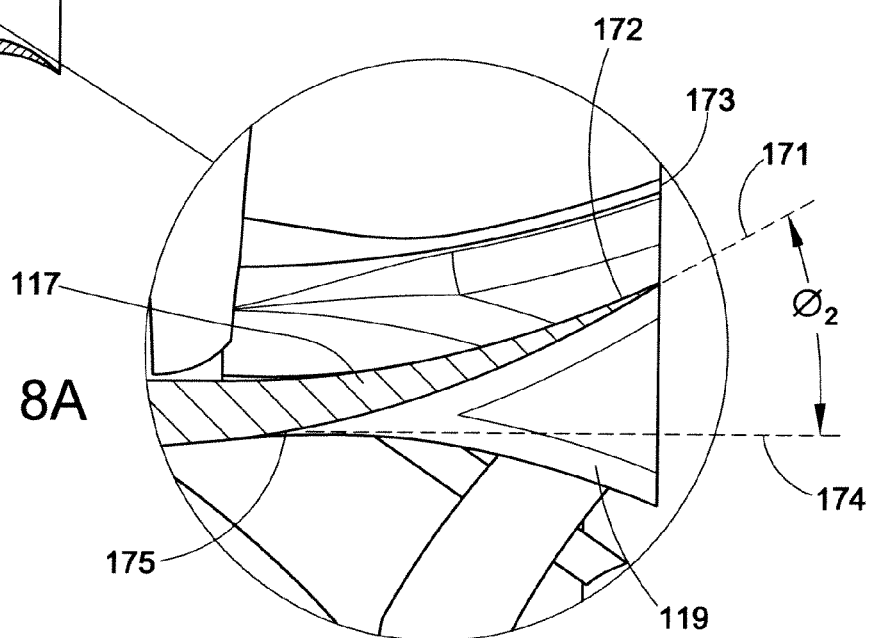

FLUID TURBINE

This application claims priority to U.S. Provisional Patent Application Ser. No. 61/415,550, filed Nov. 19, 2010. This application is also a continuation-in-part from U.S. patent application Ser. No. 12/054,050, filed Mar. 24, 2008 now U.S. Pat. No. 8,021,100, which claimed priority from U.S. Provisional Patent Application Ser. No. 60/919,588, filed Mar. 23, 2007. This application is also a continuation-in-part from U.S. patent application Ser. No. 12/823,220, filed Jun. 25, 2010, which is a continuation-in-part application of U.S. patent application Ser. No. 12/555,446, filed Sep. 8, 2009 now U.S. Pat. No. 8,393,850, which claims priority from U.S. Provisional Patent Application Ser. No. 61/191,358, filed on Sep. 8, 2008. The disclosures of these applications are hereby fully incorporated by reference in their entirety.

BACKGROUND

The present disclosure relates to shrouded fluid turbines having one or more shrouds. The shrouds are made from a combination of (i) a hard shell or skeleton; and (ii) a membrane or skin.

Conventional horizontal axis wind turbines (HAWTs) used for power generation have two to five open blades arranged like a propeller, the blades being mounted to a horizontal shaft attached to a gear box which drives a power generator. HAWTs will not exceed the Betz limit of 59.3% efficiency in capturing the potential energy of the wind passing through it. HAWTs are also heavy, requiring substantial support and increasing transport costs of the components.

It would be desirable to increase the efficiency of a fluid turbine by collecting additional energy from the fluid. It would also be desirable to modify the mass and size of a fluid turbine.

BRIEF DESCRIPTION

The present disclosure relates to shrouded fluid turbines and fluid turbine shrouds, wherein the shroud is formed from a hard shell and a membrane, as described further herein. Such fluid turbines are lighter and allow for less substantial supports in the turbine body.

Disclosed in embodiments is a fluid turbine comprising a shroud. The shroud comprises a leading edge, a trailing edge, an interior surface, and an exterior surface. The shroud is formed from at least one shroud segment. Each shroud segment is formed from a hard shell member and a membrane. The leading edge, trailing edge, and interior surface of the shroud segment is formed from the hard shell member. The exterior surface of the shroud segment is formed from the membrane. The shroud can be either a turbine shroud or an ejector shroud.

The leading edge of the shroud can be a circular shape.

Sometimes, the shroud will have mixing lobes. The trailing edge of the shroud will have a circular crenellated shape.

The hard shell member may comprise a front edge, a rear edge, an interior face, a front lip, and a rear lip. The arcuate front edge has a first end and a second end. The rear edge comprises a first outer edge and a second outer edge located in an outer plane; an inner edge located in an inner plane and between the first and second outer edges; a first radial edge extending from a first end of the inner edge to an interior end of the first outer edge; and a second radial edge extending from a second end of the inner edge to an interior end of the second outer edge. The interior face extends from the front edge to the rear edge. The front lip is located on the arcuate front edge transverse to the interior face. The rear lip is located on the rear edge transverse to the interior face.

In some embodiments, the hard shell member further comprises: a first lateral face extending from an exterior end of the first outer edge to the first end of the front edge; and a second lateral face extending from an exterior end of the second outer edge to the second end of the front edge.

In other embodiments, the first outer edge and the second outer edge have a common outer radius of curvature, the inner edge has an inner radius of curvature, and the front edge has a front radius of curvature. The front radius of curvature is less than the outer radius of curvature. The inner radius of curvature is less than the outer radius of curvature.

The trailing edge of the shroud may be a circular shape.

In other different embodiments, the hard shell member comprises a circular front lip, a circular rear lip, and an interior face extending from the front lip to the rear lip. The front lip and the rear lip are transverse to the interior face. The interior face is cambered.

The hard shell member may be formed from a rigid material selected from the group consisting of polymers, metals, and mixtures thereof. In specific embodiments, the rigid material is a glass reinforced polymer.

The membrane may comprise a film of a polyurethane-polyurea copolymer material. The membrane may be reinforced with a highly crystalline polyethylene, para-aramid fibers, or a polyaramide material. The membrane may also comprise a plurality of layers.

Also disclosed in embodiments is a shrouded fluid turbine, comprising: an impeller; a turbine shroud surrounding the impeller, a trailing edge of the turbine shroud having a circular crenellated shape; and an ejector shroud, an inlet end of the ejector shroud surrounding a rear end of the turbine shroud; wherein a leading edge, the trailing edge, and an interior surface of the turbine shroud is formed from a first hard shell member; and wherein an exterior surface of the turbine shroud is formed from a first membrane.

In additional embodiments, a leading edge, a trailing edge, and a interior surface of the ejector shroud is formed from a second hard shell member; and wherein an exterior surface of the ejector shroud is formed from a second membrane.

The second hard shell member may comprise a circular front lip, a circular rear lip, and an interior face extending from the front lip to the rear lip; wherein the front lip and the rear lip are transverse to the interior face. The interior face is cambered.

In particular embodiments, the first hard shell member comprises: an arcuate front edge having a first end and a second end; a rear edge comprising: a first outer edge and a second outer edge located in an outer plane; an inner edge located in an inner plane and between the first and second outer edges; a first radial edge extending from a first end of the inner edge to an interior end of the first outer edge; and a second radial edge extending from a second end of the inner edge to an interior end of the second outer edge; an interior face extending from the front edge to the rear edge; a front lip on the arcuate front edge transverse to the interior face; and a rear lip on the rear edge transverse to the interior face.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

FIG. 5 is a front left perspective view of an exemplary shrouded fluid turbine.

FIG. 6 is a rear right perspective view of the shrouded fluid turbine of FIG. 5.

FIG. 8 is a smaller view of FIG. 7.

FIG. 8A and FIG. 8B are magnified views of the mixing lobes of the fluid turbine of FIG. 8.

DETAILED DESCRIPTION

Figure 1:
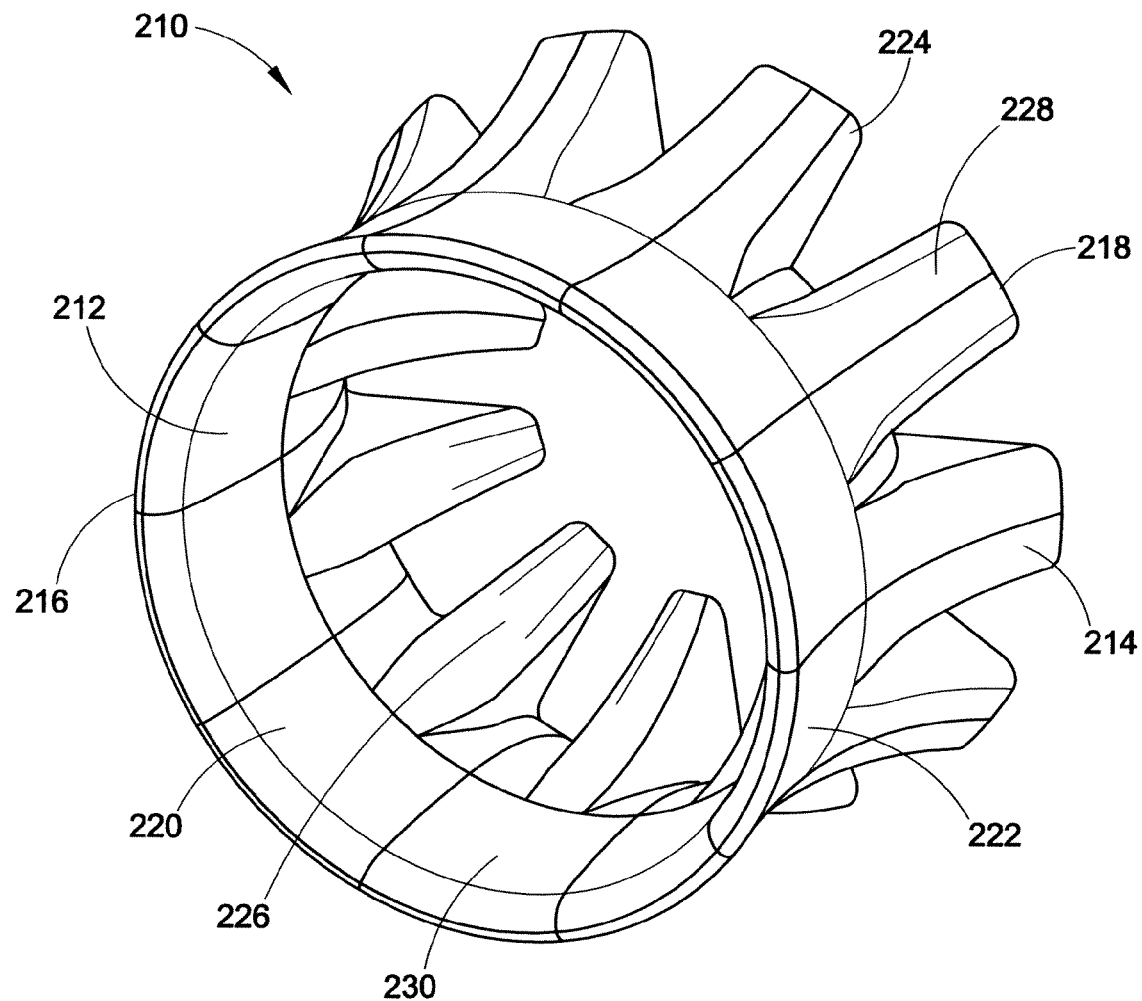
FIG. 1 is a front perspective view of an assembled turbine shroud of the present disclosure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the exemplary embodiments.

Although specific terms are used in the following description, these terms are intended to refer only to particular structures in the drawings and are not intended to limit the scope of the present disclosure. It is to be understood that like numeric designations refer to components of like function.

The term "about" when used with a quantity includes the stated value and also has the meaning dictated by the context. For example, it includes at least the degree of error associated with the measurement of the particular quantity. When used in the context of a range, the term "about" should also be considered as disclosing the range defined by the absolute values of the two endpoints. For example, the range "from about 2 to about 4" also discloses the range "from 2 to 4."

A Mixer-Ejector Power System (MEPS) provides an improved means of generating power from wind currents. A primary shroud contains an impeller which extracts power from a primary wind stream. A mixer-ejector pump is included that ingests flow from the primary wind stream and secondary flow, and promotes turbulent mixing. This enhances the power system by increasing the amount of air flow through the system, reducing back pressure on turbine blades, and reducing noise propagating from the system.

The term "impeller" is used herein to refer to any assembly in which blades are attached to a shaft and able to rotate, allowing for the generation of power or energy from fluid rotating the blades. Exemplary impellers include a propeller or a rotor/stator assembly. Any type of impeller may be enclosed within the turbine shroud in the fluid turbine of the present disclosure.

The leading edge of a turbine shroud may be considered the front of the fluid turbine, and the trailing edge of an ejector shroud may be considered the rear of the fluid turbine. A first component of the fluid turbine located closer to the front of the turbine may be considered "upstream" of a second component located closer to the rear of the turbine. Put another way, the second component is "downstream" of the first component.

The shrouded fluid turbines of the present disclosure comprise a turbine shroud and optionally an ejector shroud located downstream of the turbine shroud. The turbine shroud and/or the ejector shroud are made from a combination of a hard shell and a membrane. This construction generally allows the turbine and/or ejector shroud to have reduced weight compared to a shroud made entirely of the hard shell material because the membrane material has a lower density than the hard shell material. The reduced weight has several advantages, including allowing the use of less substantial supports and reducing transportation costs. Such shrouds are useful on both wind turbines and water turbines.

FIG. 1 shows a first exemplary embodiment of a turbine shroud 210 of the present disclosure. The turbine shroud includes a front end 212 having a leading edge 216. The turbine shroud also includes a rear end 214 having a trailing edge 218. An interior surface 220 and an exterior surface 222 run from the leading edge 216 to the trailing edge 218. The interior surface is inside the turbine shroud, while the exterior surface is on the outside of the turbine shroud.

The turbine shroud 210 has the cross-sectional shape of an airfoil with the suction side (i.e. low pressure side) on the interior of the shroud. The leading edge 216 of the shroud is circular when viewed from the front. The rear end 214 of the turbine shroud also has mixing lobes 224. Put another way, the trailing edge 218 of the turbine shroud is formed from a plurality of mixing lobes 224, or as will be further described herein, the trailing edge of the turbine shroud has a circular crenellated shape. Two different sets of mixing lobes 224 are present. High energy mixing lobes 226 extend inwardly towards the central axis 205 of the turbine shroud. Low energy mixing lobes 228 extend outwardly away from the central axis. As seen here, the turbine shroud is assembled from at least one shroud segment 230.

Figure 2A:
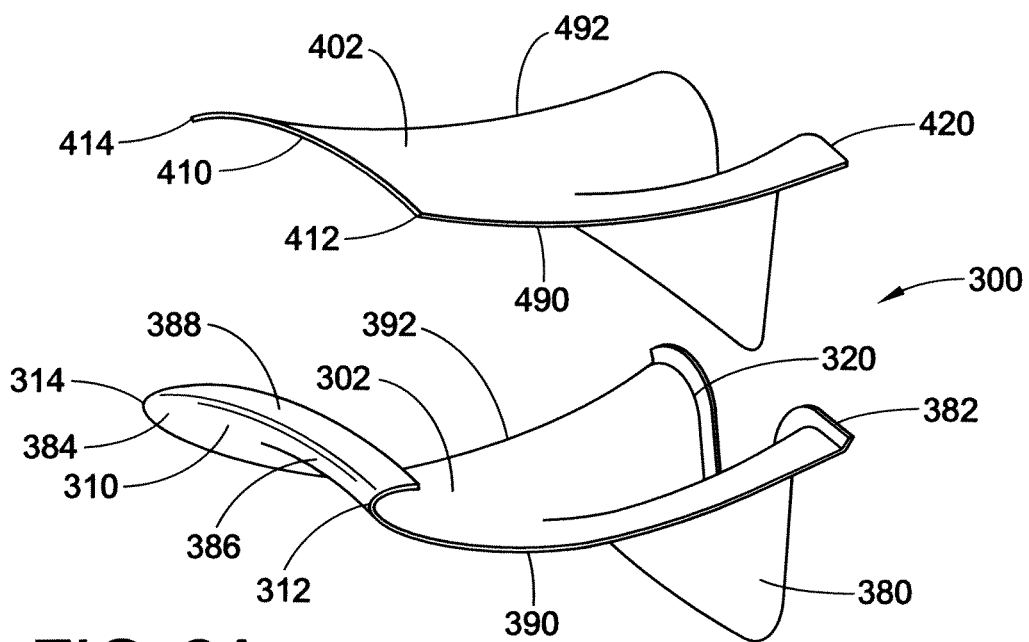
FIGS. 2A and 2B are perspective views of a hard shell member and a membrane that can be combined to form a segment of the fluid turbine shroud of FIG. 1.
Figure 2B:
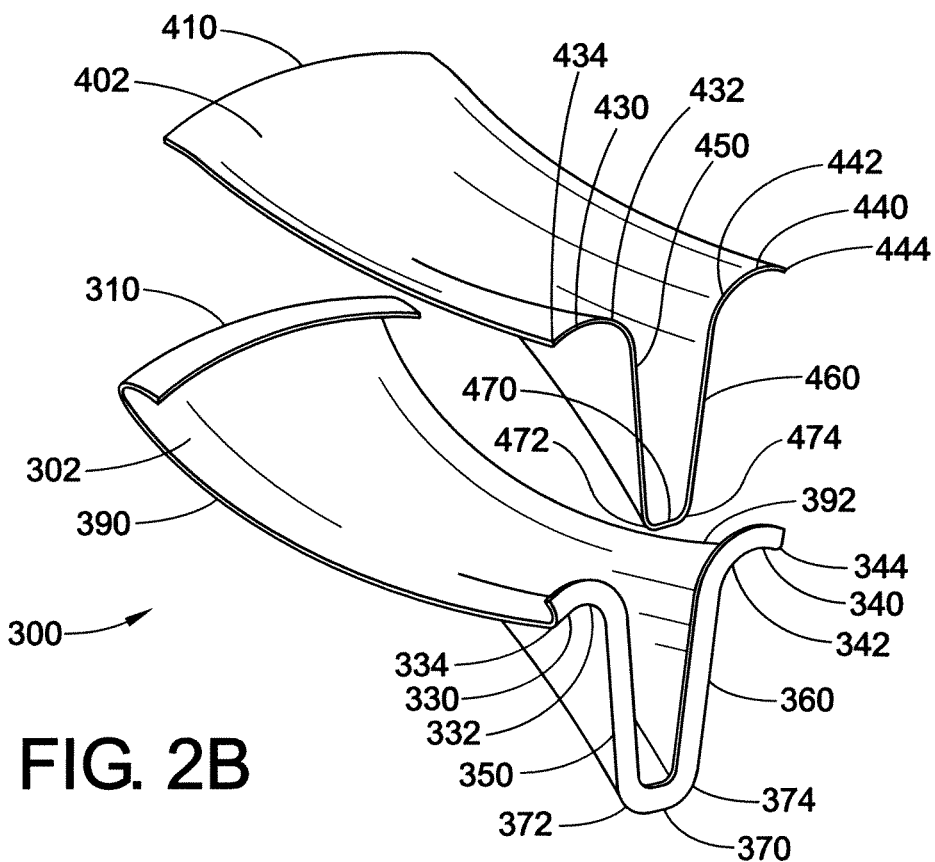
Figure 2C:
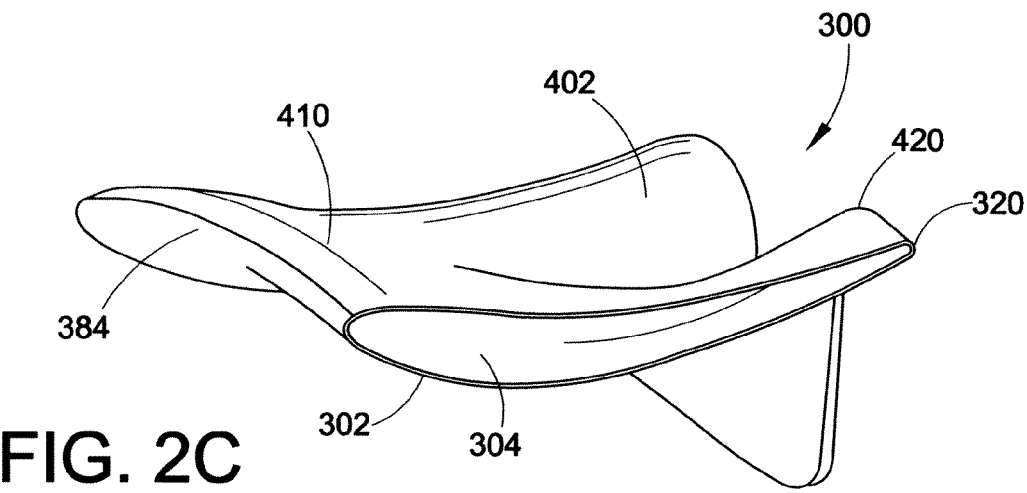
FIG. 2C is a perspective view showing a turbine shroud segment assembled from a hard shell member and a membrane.

FIGS. 2A-2C provide various views of one embodiment of a shroud segment that is suitable for forming a shroud with mixing lobes as seen in FIG. 1. The shroud segment 300 is formed from two pieces, a hard shell member 302 and a membrane 402.

The hard shell member 302 has an arcuate front edge 310 and a rear edge 320. The term "edge" should not be construed herein as referring to a two-dimensional line. As seen here, the front edge 310 and the rear edge 320 are rounded. The front edge 310 has a first end 312 and a second end 314.

The rear edge 320 can be considered as including a first outer edge 330, a second outer edge 340, a first radial edge 350, a second radial edge 360, and an inner edge 370. The first outer edge 330 and the second outer edge 340 are located in an outer plane. As will be shown later, that outer plane may appear to be generally cylindrical depending on the perspective. The inner edge 370 is located in an inner plane, which may also appear to be generally cylindrical depending on the perspective. The first outer edge 330 has an interior end 332 and an exterior end 334. Similarly, the second outer edge 340 has an interior end 342 and an exterior end 344. In particular embodiments, the first outer edge and the second outer edge are of substantially the same length. The distance between the first outer edge interior end 332 and the second outer edge interior end 342 is less than the distance between the first outer edge exterior end 534 and the second outer edge exterior end 544.

The first radial edge 350 extends from a first end 372 of the inner edge 370 to the interior end 332 of the first outer edge 330. Similarly, the second radial edge 360 extends from a second end 374 of the inner edge 370 to the interior end 342 of the second outer edge 340. The resulting rear edge 320 could be described as having a partial castellated or crenellated shape, or as having a shape similar to a capital letter V when written in cursive D'Nealian script.

An interior face 380 extends from the front edge 310 to the rear edge 320. The interior face 380 forms the interior of the resulting fluid turbine shroud. Put another way, the interior face is on the low suction side of the shroud. The lateral edges 390, 392 of the interior face are cambered to form an airfoil shape.

A rear lip 382 is present on the rear edge 320 and transverse to the interior face 380. Similarly, a front lip 384 is present on the front edge 310 and transverse to the interior face 380. Both the front lip 384 and the rear lip 382 extend away from the interior face 380. The front lip 384 can also be described as having a first surface 386 that is transverse to the interior face and a second surface 388 that curls over the interior face.

The membrane 402 can also be considered as having a front edge 410, a rear edge 420, a first lateral edge 490, and a second lateral edge 492. The front edge 410 has a first end 412 and a second end 414. The rear edge 420 can be considered as including a first outer edge 430, a second outer edge 440, a first radial edge 450, a second radial edge 460, and an inner edge 470. The first outer edge 430 and the second outer edge 440 are located in an outer plane. The inner edge 470 is located in an inner plane. The first outer edge 430 has an interior end 432 and an exterior end 434. Similarly, the second outer edge 440 has an interior end 442 and an exterior end 444. In particular embodiments, the first outer edge 430 and the second outer edge 440 are of substantially the same length. The distance between the first outer edge interior end 432 and the second outer edge interior end 442 is less than the distance between the first outer edge exterior end 434 and the second outer edge exterior end 444.

The first radial edge 450 extends from a first end 472 of the inner edge 470 to the interior end 432 of the first outer edge 430. Similarly, the second radial edge 460 extends from a second end 474 of the inner edge 470 to the interior end 442 of the second outer edge 440. The resulting rear edge 420 can also be described as having a partial castellated or crenellated shape. The two lateral edges 490, 492 extend from the front edge 410 to the rear edge 420.

FIG. 2C shows the hard shell member 302 and the membrane 402 assembled to form the shroud segment 300. The front edge 410 of the membrane 402 is connected to the front lip 384 of the hard shell member 302. The rear edge 420 of the membrane 402 is connected to the rear lip 320 of the hard shell member 302. The lateral surfaces 304, 306 of the shroud segment, formed between the hard shell member and the membrane, have a cambered airfoil shape.

Figure 3:
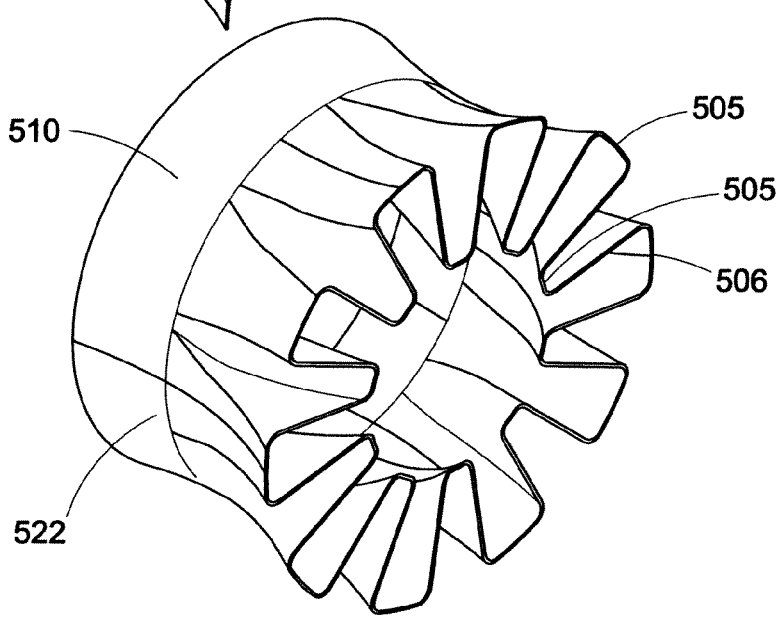
FIG. 3 is a rear perspective view of a second embodiment of a hard shell member and a membrane used to form a turbine shroud.

In FIG. 3, a second exemplary embodiment is shown where the shroud 500 is formed from two shroud segments. Here, the two hard shell members are connected, and the membrane is subsequently connected to a hard shell member. The embodiment is shown here with one hard shell member 510 visible, one membrane 522 already applied, and the second membrane 512 separate from the hard shell member 510. The resulting shroud 500 also has a plurality of mixing lobes 505 formed on the trailing edge 506 thereof.

Figure 4A:
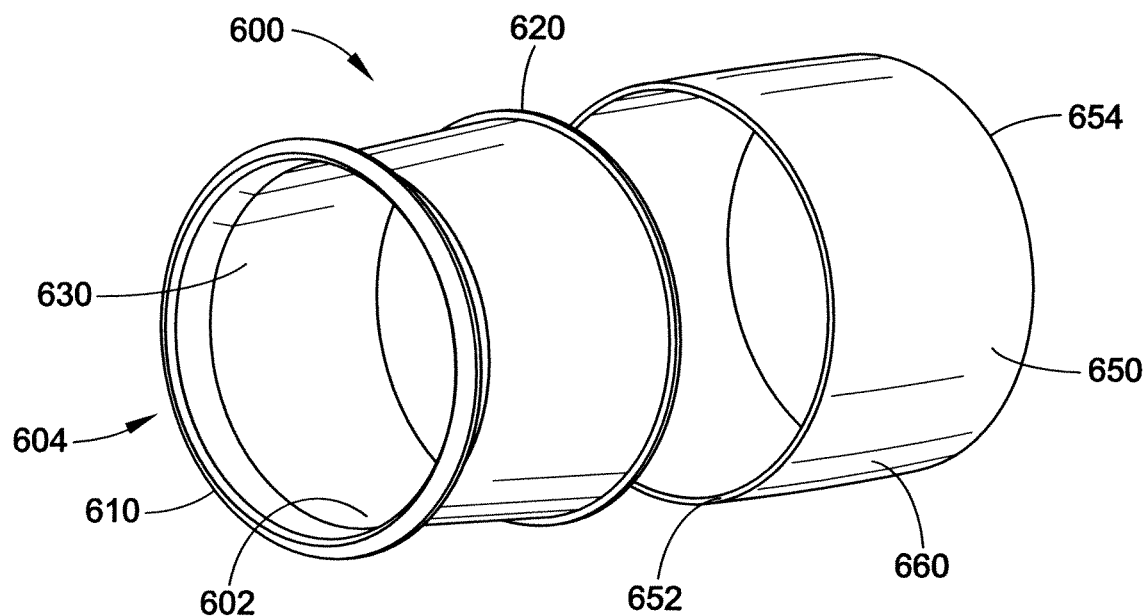
FIGS. 4A and 4B are perspective views of a hard shell member and a membrane that can be combined to form an ejector shroud.
Figure 4B:
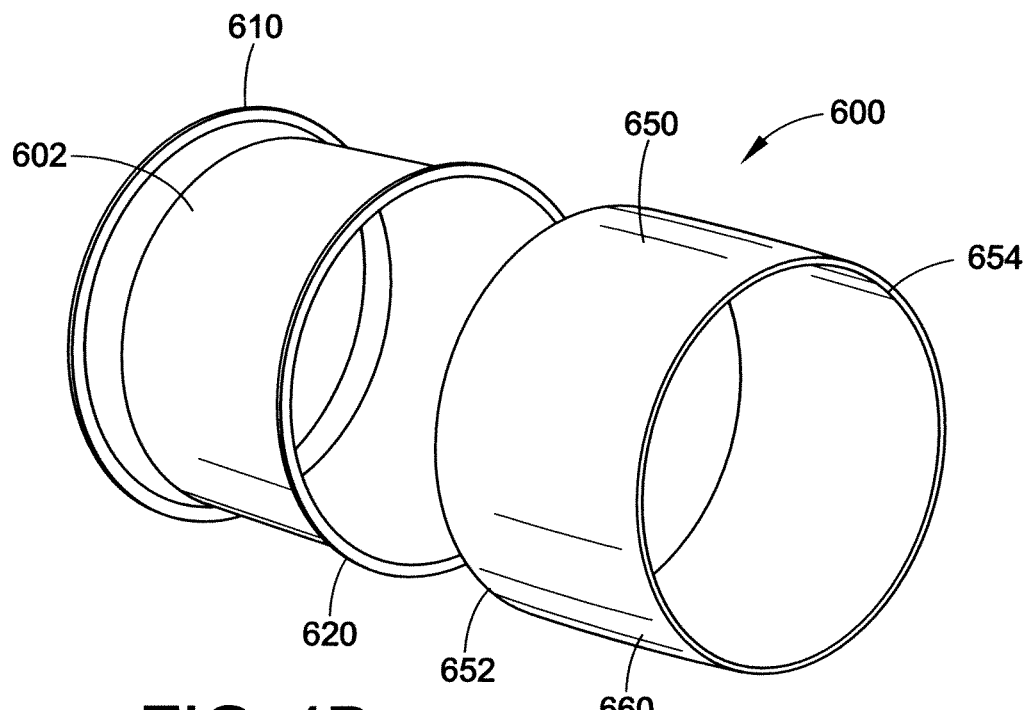
Figure 4C:
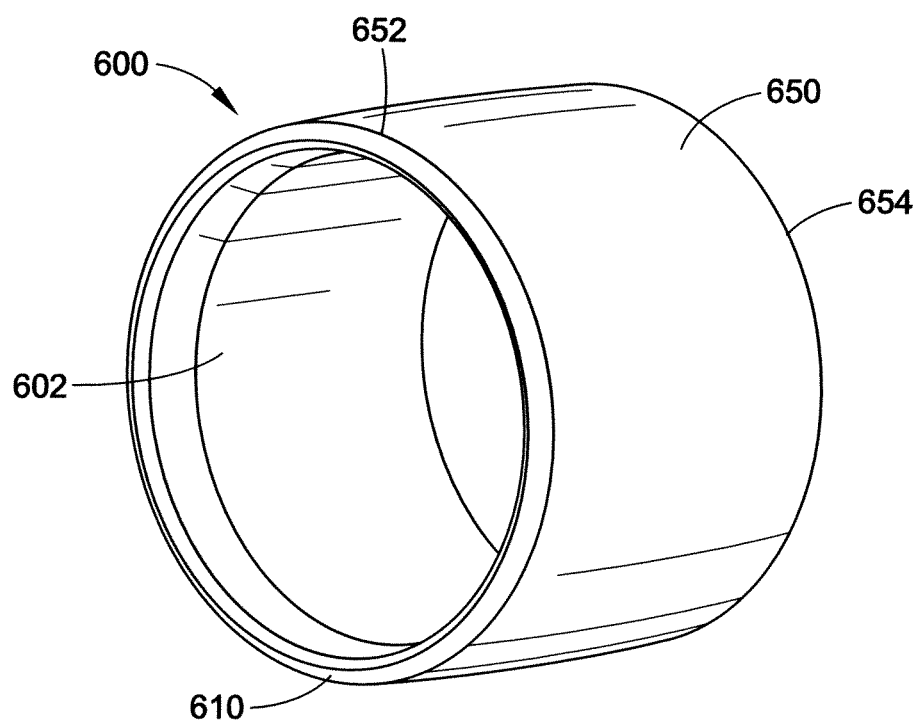
FIG. 4C is a perspective view showing an ejector shroud assembled from a hard shell member and a membrane.

FIGS. 4A-4C provide various views of one embodiment of a shroud segment 600 that is suitable for forming a cambered ejector shroud. Again, the shroud segment 600 is formed from two pieces, a hard shell member 602 and a membrane 650. On the ejector shroud shown here, both the leading edge and the trailing edge have a circular shape.

The hard shell member 602 has a circular front lip 610 and a circular rear lip 620. The term "circular" here is considered from the front view, indicating for example that the front lip 620 surrounds the inlet end 604 of the ejector shroud. An interior face 630 extends between the front lip 610 and the rear lip 620. As will be seen further in FIG. 7, the interior face is cambered. The interior face forms the interior of the resulting ejector shroud. Put another way, the interior face is on the low suction side of the shroud.

The front lip 610 and the rear lip 620 are generally transverse to the interior face 630. Put another way, the front lip and the rear lip could be considered as parallel to each other.

The membrane 650 includes a front edge 652, a rear edge 654, and a surface 660 joining the two edges.

FIG. 4C shows the hard shell member 602 and the membrane 650 assembled to form the ejector shroud segment. The front edge 652 of the membrane 650 is connected to the front lip 610 of the hard shell member 602. The rear edge 654 of the membrane 650 is connected to the rear lip 620 of the hard shell member 602. The resulting ejector shroud segment has a cambered airfoil shape.

The hard shell member is formed from a rigid material. In this regard, the terms "hard" and "rigid" are relative to the membrane. Rigid materials include, but are not limited to, polymers, metals, and mixtures thereof. Other rigid materials such as glass reinforced polymers may also be employed. Rigid surface areas around fluid inlets and outlets may improve the aerodynamic properties of the shrouds. The rigid surface areas may be in the form of panels or other constructions.

The membrane portion(s) of the shroud allows the exterior surface to be manufactured easily, and allows the exterior surface to be easily replaced as well. In addition, the membrane can flex, reducing buildup of ice or snow on the shroud.

The membrane of the turbine shroud and the ejector shroud may be generally formed of any polymeric film or fabric material. Exemplary materials include polyvinyl chloride (PVC), polyurethane, polyfluoropolymers, and multi-layer films of similar composition. Stretchable fabrics, such as spandex-type fabrics or polyurethane-polyurea copolymer containing fabrics, may also be employed.

Polyurethane films are tough and have good weatherability. The polyester-type polyurethane films tend to be more sensitive to hydrophilic degradation than polyether-type polyurethane films. Aliphatic versions of these polyurethane films are generally ultraviolet resistant as well.

Exemplary polyfluoropolymers include polyvinyldidene fluoride (PVDF) and polyvinyl fluoride (PVF). Commercial versions are available under the trade names KYNAR® and TEDLAR®. Polyfluoropolymers generally have very low surface energy, which allow their surface to remain somewhat free of dirt and debris, as well as shed ice more readily as compared to materials having a higher surface energy.

The membrane may be reinforced with a reinforcing material. Examples of reinforcing materials include but are not limited to highly crystalline polyethylene fibers, paramid fibers, and polyaramides.

The membrane may independently be multi-layer, comprising one, two, three, or more layers. Multi-layer constructions may add strength, water resistance, UV stability, and other functionality. However, multi-layer constructions may also be more expensive and add weight to the overall fluid turbine.

Film/fabric composites are also contemplated along with a backing, such as foam.

One advantage to the combination of the hard shell member and the membrane relates to ease of manufacture. In particular, shrouds including mixing lobes have complex surfaces, with alternating concave and convex surface sections. The use of a membrane allows the transition between concave and convex surface sections to be smooth, and allows the surface to be made easily by simply connecting the membrane to the front and rear edges of the hard shell member. The membrane and the hard shell member can be connected to each other using fasteners, adhesives, etc. known to those of ordinary skill in the art.

FIGS. 5-9 illustrate various aspects of a shrouded fluid turbine of the present disclosure. The shrouded fluid turbine 100 comprises an aerodynamically contoured turbine shroud 110, an aerodynamically contoured nacelle body 150, an impeller 140, and an aerodynamically contoured ejector shroud 120. The turbine shroud 110 includes a front end 112 and a rear end 114. The ejector shroud 120 includes an inlet end 122 and an exhaust end 124. Support members 106 connect the turbine shroud 110 to the ejector shroud 120.

The impeller 140 surrounds the nacelle body 150. Here, the impeller is a rotor/stator assembly comprising a stator 142 having stator vanes 144 and a rotor 146 having rotor blades 148. The rotor 146 is downstream and "in-line" with the stator vanes 144. Put another way, the leading edges of the rotor blades are substantially aligned with the trailing edges of the stator vanes. The rotor blades are held together by an inner ring and an outer ring (not visible), and the rotor 146 is mounted on the nacelle body 150. The nacelle body 150 is connected to the turbine shroud 110 through the stator 142, or by other means. A central passageway 152 extends through the nacelle body 150.

The turbine shroud has the cross-sectional shape of an airfoil with the suction side (i.e. low pressure side) on the interior of the shroud. The rear end 114 of the turbine shroud also has mixing lobes 116. The mixing lobes extend downstream beyond the rotor blades. Put another way, the trailing edge 118 of the turbine shroud is formed from a plurality of mixing lobes. The rear or downstream end of the turbine shroud is shaped to form two different sets of mixing lobes 116. High energy mixing lobes 117 extend inwardly towards the central axis 105 of the mixer shroud. Low energy mixing lobes 119 extend outwardly away from the central axis 105. These mixing lobes are more easily seen in FIG. 6.

A mixer-ejector pump (indicated by reference numeral 101) comprises an ejector shroud 120 surrounding the ring of mixing lobes 116 on the turbine shroud 110. The mixing lobes 116 extend downstream and into an inlet end 122 of the ejector shroud 120. This mixer/ejector pump provides the means for consistently exceeding the Betz limit for operational efficiency of the fluid turbine.

The turbine shroud's entrance area and exit area will be equal to or greater than that of the annulus occupied by the impeller. The internal flow path cross-sectional area formed by the annulus between the nacelle body and the interior surface of the turbine shroud is aerodynamically shaped to have a minimum cross-sectional area at the plane of the turbine and to otherwise vary smoothly from their respective entrance planes to their exit planes. The ejector shroud entrance area is greater than the exit plane area of the turbine shroud.

Several optional features may be included in the shrouded fluid turbine. A power take-off, in the form of a wheel-like structure, can be mechanically linked at an outer rim of the impeller to a power generator. Sound absorbing material can be affixed to the inner surface of the shrouds, to absorb and prevent propagation of the relatively high frequency sound waves produced by the turbine. The fluid turbine can also contain blade containment structures for added safety. The shrouds will have an aerodynamic contour in order to enhance the amount of flow into and through the system. The inlet and outlet areas of the shrouds may be non-circular in cross section such that shroud installation is easily accommodated by aligning the two shrouds. A swivel joint may be included on a lower outer surface of the turbine for mounting on a vertical stand/pylon, allowing the turbine to be turned into the fluid in order to maximize power extraction. Vertical aerodynamic stabilizer vanes may be mounted on the exterior of the shrouds to assist in keeping the turbine pointed into the fluid.

The area ratio of the ejector pump, as defined by the ejector shroud 120 exit area over the turbine shroud 110 exit area, will be in the range of 1.5-3.0. The number of mixing lobes can be between 6 and 28. The height-to-width ratio of the lobe channels will be between 0.5 and 4.5. The mixing lobe penetration will be between 50% and 80%. The nacelle body 150 plug trailing edge angles will be thirty degrees or less. The length to diameter (L/D) of the overall fluid turbine will be between 0.5 and 1.25.

Figure 9:
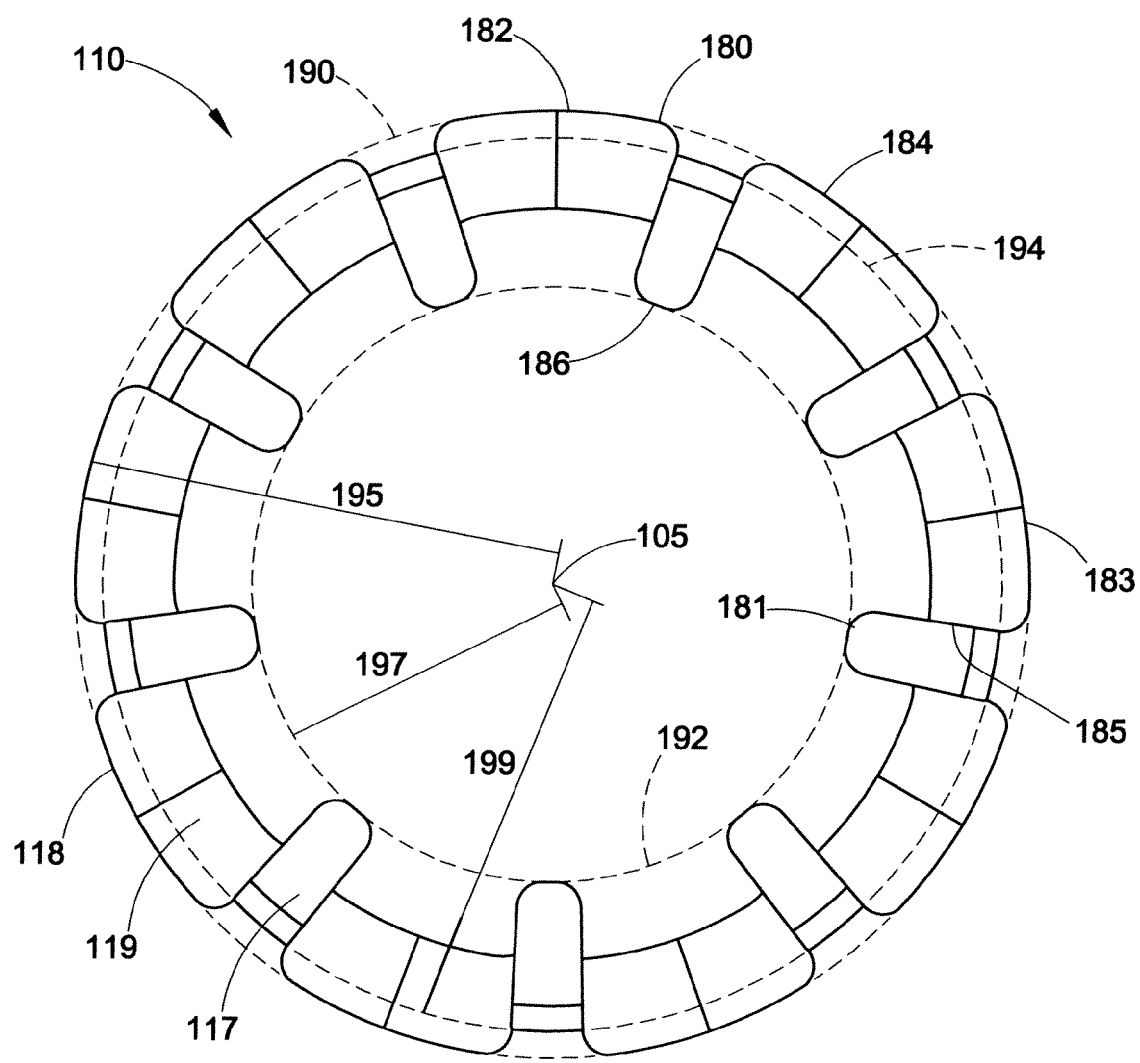
FIG. 9 is a rear view of the shrouded fluid turbine of FIG. 5. The blades of the impeller are removed from this figure so that other aspects of the fluid turbine can be more clearly seen and explained.

Referring now to FIG. 9, the turbine shroud 110 has a set of nine high energy mixing lobes 117 that extend inwards toward the central axis 105 of the turbine. The turbine shroud also has a set of nine low energy mixing lobes 119 that extend outwards away from the central axis. The high energy mixing lobes alternate with the low energy mixing lobes around the trailing edge 118 of the turbine shroud. The impeller 140, turbine shroud 110, and ejector shroud 120 are coaxial with each other, i.e. they share a common central axis 105.

The trailing edge 118 of the turbine shroud 110 has a circular crenellated shape. The trailing edge can be described as including several inner circumferentially spaced arcuate portions 181 which each have the same radius of curvature. Those inner arcuate portions 181 are evenly spaced apart from each other. Between portions are several outer arcuate portions 183, which each have the same radius of curvature. The radius of curvature for the inner arcuate portions 181 is different from the radius of curvature for the outer arcuate portions 183, but the inner arcuate portions and outer arcuate portions have the same center (i.e. along the central axis). The inner arcuate portions 181 and the outer arcuate portions 183 are then connected to each other by radially extending portions 185. This results in a circular crenellated shape. The term "crenellated" as used herein does not require the inner arcuate portions, outer arcuate portions, and radially extending portions to be straight lines, but instead refers to the general up-and-down or in-and-out shape of the trailing edge. This crenellated structure forms two sets of mixing lobes, high energy mixing lobes 117 and low energy mixing lobes 119.

Figure 7:
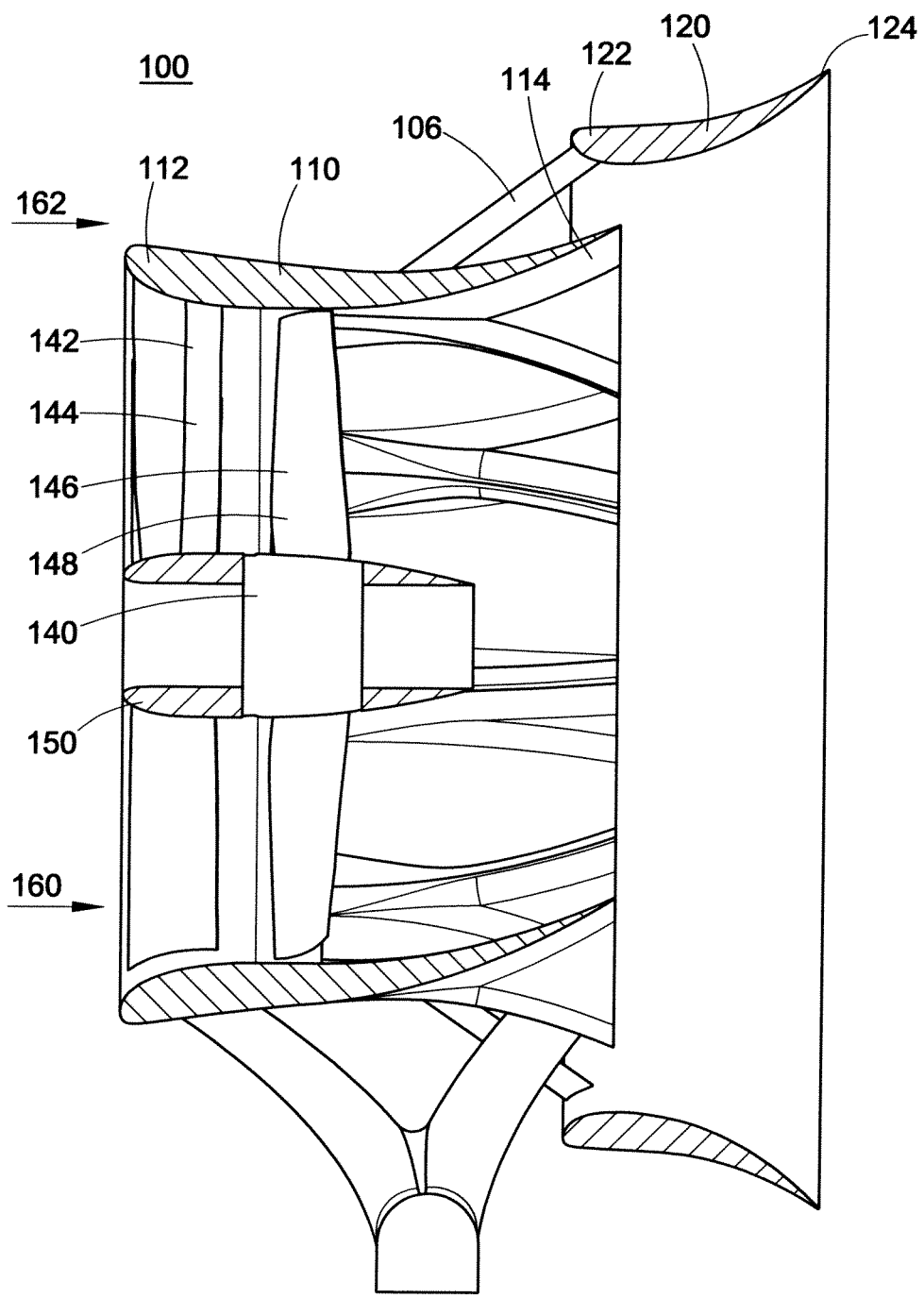
FIG. 7 is a cross-sectional view of the shrouded fluid turbine of FIG. 5.

Referring now to FIG. 7, free stream fluid (indicated generally by arrow 160, and which may be, for example, wind or water) passing through the stator 142 has its energy extracted by the rotor 146. High energy fluid indicated by arrow 162 bypasses the turbine shroud 110 and stator 142, flows over the exterior of the turbine shroud 110, and is directed inwardly by the high energy mixing lobes 117. The low energy mixing lobes 119 cause the low energy fluid exiting downstream from the rotor 146 to be mixed with the high energy fluid 162.

Referring now to FIG. 8A, a tangent line 171 is drawn along the interior trailing edge indicated generally at 172 of the high energy mixing lobe 117. A rear plane 173 of the turbine shroud 110 is present. A line 174 is formed normal to the rear plane 173 and tangent to the point 175 where a low energy mixing lobe 119 and a high energy mixing lobe 117 meet. An angle $Ø_2$ is formed by the intersection of tangent line 171 and line 174. This angle $Ø_2$ is between 5 and 65 degrees. Put another way, a high energy mixing lobe 117 forms an angle $Ø_2$ between 5 and 65 degrees relative to a longitudinal axis of the turbine shroud 110. In particular embodiments, the angle $Ø_2$ is from about 35° to about 50°.

In FIG. 8B, a tangent line 176 is drawn along the interior trailing edge indicated generally at 177 of the low energy mixing lobe 119. An angle Ø is formed by the intersection of tangent line 176 and line 174. This angle Ø is between 5 and 65 degrees. Put another way, a low energy mixing lobe 119 forms an angle Ø between 5 and 65 degrees relative to a longitudinal axis of the turbine shroud 110. In particular embodiments, the angle Ø is from about 35° to about 50°.

Mixing lobes are present on the turbine shroud. As shown in FIG. 2, the ejector shroud 120 has a ring airfoil shape and does not have mixing lobes. If desired, though, mixing lobes may also be formed on a trailing edge 128 of the ejector shroud.

FIG. 9 is a rear view that illustrates some additional aspects of the fluid turbine shroud and the shroud segments when mixing lobes are present. Referring to fluid turbine shroud segment 180, the first outer edge 182, the second outer edge 184, and the inner edge 186 are visible. The first outer edge 182 and the second outer edge 184 are located in an outer plane, which is indicated here with reference numeral 190. The inner edge 186 is located in an inner plane indicated here with reference numeral 192. As seen from this perspective, the outer plane 190 and inner plane 192 are generally cylindrical, with their axis being the central axis 105. The outer plane 190 and inner plane 192 are also coaxial.

In addition, the first outer edge 182 and the second outer edge 184 of the shroud segment 180 can be considered as having a common outer radius of curvature 195. The term "common" is used here to mean that the first outer edge and the second outer edge have the same radius of curvature. Similarly, the inner edge 186 has an inner radius of curvature 197. The front edge (not visible) of the shroud segment 180, indicated here as dotted circle 194, has a front radius of curvature 199. The outer radius of curvature 195 of the shroud segment is greater than the inner radius of curvature 197. The front radius of curvature 199 of the shroud segment 180 can be greater than, substantially equal to, or less than the outer radius of curvature 195.

In specific embodiments, the outer radius of curvature 195 of the shroud segment is greater than the inner radius of curvature 197, and the front radius of curvature 199 of the shroud segment 180 is also less than the outer radius of curvature 195.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A fluid turbine comprising:
a shroud formed from at least one shroud segment having a leading edge, a trailing edge, an interior surface, and an exterior surface, the at least one shroud segment including a hard shell member and a membrane;
wherein the leading edge, the trailing edge, and the interior surface of the shroud segment are formed from the hard shell member, the hard shell member including:
an arcuate front edge having a first end and a second end;
a rear edge including:
a first outer edge and a second outer edge located in an outer plane;
an inner edge located in an inner plane and located between the first and second outer edges;
a first radial edge extending from a first end of the inner edge to an interior end of the first outer edge; and
a second radial edge extending from a second end of the inner edge to an interior end of the second outer edge;
an interior face extending from the front edge to the rear edge;
a front lip on the arcuate front edge transverse to the interior face; and
a rear lip on the rear edge transverse to the interior face; and
wherein the exterior surface of the shroud segment is formed from the membrane.

2. The fluid turbine of claim 1, wherein a trailing edge of the shroud has a circular crenellated shape.

3. The fluid turbine of claim 2, wherein a leading edge of the shroud has a circular shape.

4. The fluid turbine of claim 1, wherein the hard shell member further comprises:
a first lateral face extending from an exterior end of the first outer edge to the first end of the front edge; and
a second lateral face extending from an exterior end of the second outer edge to the second end of the front edge.

5. The fluid turbine shroud segment of claim 1, wherein the first outer edge and the second outer edge have a common outer radius of curvature, the inner edge has an inner radius of curvature, and the front edge has a front radius of curvature;
wherein the front radius of curvature is smaller than the outer radius of curvature; and
wherein the inner radius of curvature is smaller than the outer radius of curvature.

6. The fluid turbine of claim 1, wherein the interior face is cambered.

7. The fluid turbine of claim 1, wherein the hard shell member is formed from a rigid material selected from the group consisting of polymers, metals, and mixtures thereof.

8. The fluid turbine of claim 7, wherein the rigid material is a glass reinforced polymer.

9. The fluid turbine of claim 1, wherein the membrane comprises a film of a polyurethane-polyurea copolymer material.

10. The fluid turbine of claim 1, wherein the membrane is reinforced with a highly crystalline polyethylene, para-aramid fibers, or a polyaramide material.

11. The fluid turbine of claim 1, wherein the membrane comprises a plurality of layers.

12. A shrouded fluid turbine, comprising:
an impeller;
a turbine shroud surrounding the impeller, a trailing edge of the turbine shroud having a circular crenellated shape; and
an ejector shroud, an inlet end of the ejector shroud surrounding a rear end of the turbine shroud;

wherein a leading edge, the trailing edge, and an interior surface of the turbine shroud are formed from a first hard shell member, the first hard shell member including:

an arcuate front edge having a first end and a second end;

a rear edge including:
- a first outer edge and a second outer edge located in an outer plane;
- an inner edge located in an inner plane and located between the first and second outer edges;
- a first radial edge extending from a first end of the inner edge to an interior end of the first outer edge; and
- a second radial edge extending from a second end of the inner edge to an interior end of the second outer edge;

an interior face extending from the front edge to the rear edge;

a front lip on the arcuate front edge transverse to the interior face; and a rear lip on the rear edge transverse to the interior face; and wherein an exterior surface of the turbine shroud is formed from a first membrane.

13. The fluid turbine of claim 12, wherein a leading edge, a trailing edge, and an interior surface of the ejector shroud are formed from a second hard shell member; and wherein an exterior surface of the ejector shroud is formed from a second membrane.

14. The fluid turbine of claim 13, wherein the second hard shell member comprises a circular front lip, a circular rear lip, and a cambered interior face extending from the front lip to the rear lip; and wherein the front lip and the rear lip are transverse to the interior face.

15. The fluid turbine of claim 12, wherein the leading edge of the turbine shroud has a circular shape.

* * * * *